2,917,418

THERMOLYTIC PROCESS FOR CLEANING APPARATUS USED IN PROCESSING POLYETHYLENE TEREPHTHALATE

John A. Cathcart, Rochester, N.Y., assignor to Eastman Kodak Company, Rochester, N.Y., a corporation of New Jersey No Drawing. Application March 13, 1958
Serial No. 721,091

10 Claims. (Cl. 134—5)

This invention relates to a thermolytic process for removing unwanted residues of polyethylene terephthalate from apparatus which has been used in processing polyethylene terephthalate.

The industrial applications of polyethylene terephthalate have become increasingly important during recent years with the consequent development of methods and apparatus for processing polyethylene terephthalate in larger and larger amounts. During the commercial processing of polyethylene terephthalate the problems associated with keeping the apparatus clean have been quite extensive. Several methods have been used from time to time in an effort to remove unwanted residues of polyethylene terephthalate from various parts of the apparatus employed in making, transferring, extruding, and otherwise processing polyethylene terephthalate. Especially difficult problems have been associated with the cleaning of pipes and filters through which the polyethylene terephthalate is transmitted. Joints in the pipes and the interstices of the filters provide especially difficult regions where accumulation of unwanted residues becomes a serious problem.

One of the usual methods for cleaning apparatus containing such unwanted residues of polymers and other thermoplastic materials in general is by means of a rotating scraping, brushing or other abrading device which mechanically removes the unwanted residues from the interior surfaces of the apparatus, e.g. a pipe or reaction vessel. This method is reasonably satisfactory when used on residues of polyethylene terephthalate provided that the operation is done in an extremely careful way and preferably if the apparatus is finally cleaned with a solvent which may be applied with or without an abrading (e.g. brushing) operation so as to remove the final traces of unwanted residue. In some cases, hot water (neutral, acidic or alkaline) can be used instead of a high-boiling organic solvent if extended brushing under vigorous conditions can be accomplished.

Filters used in transmitting clean, pure polyethylene terephthalate have been especially difficult to clean after they have become clogged. The cleaning of these filters has generally been accomplished by means of high boiling organic compounds which exert both solvent effects and melting effects upon the unwanted residues of polyethylene terephthalate. Unfortunately, such a technique requires high temperatures if it is to include any melting effect. For example, the use of hot polyethylene glycol as a cleaning compound is fraught with a serious fire hazard and the use of this solvent compound requires considerable safety precautions in order to prevent fires from causing serious damage. Other solvents can be used such as chlorinated aromatic compounds, tri-phenyl phosphate, diethyl phthalate, and numerous other high boiling organic compounds known to exert solvent action against polyesters at high temperatures. Although the use of such solvent compounds usually accomplished an effective cleaning action, the expense of such solvents and the precautions involved and apparatus required in their use leave much to be desired.

An alternative cleaning medium which is easier to handle than the high boiling organic solvent compounds is a solution of alkali in a mixture of ethylene glycol and water. This alkaline solution is effective at relatively low temperatues such as 120°–130° C. but functions quite slowly so that the long period of time required makes it uneconomical. It can be made more economical by melting away some of the unwanted polyester residues from the filter surfaces or interior surfaces of the pipes of other apparatus. By so doing, the bulk of solidified unwanted residues of polyethylene terephthalate can be removed before subjecting the remainder of these residues to the alkaline solution. The melting operation also tends to cause some degradation of the remaining polyester residues so that they dissolve more readily in the alkaline solution.

Although the above and other methods have been used in removing unwanted residues, no simple method for accomplishing the desired objective was apparent prior to the present invention.

An object of this invention is to provide a simple thermolytic method for cleaning apparatus containing unwanted residues of polyesters, especially polyethylene terephthalate, but having broader applications as to other polymers as well. Other objects are apparent from this specification.

It has now been discovered that the unwanted residues of polyethylene terephthalate can be removed quite efficaciously from apparatus which has been used in processing polyethylene terephthalate by a thermolytic method which broadly comprises (A) internally contacting said apparatus with a gas heated at from about 275° C. to about 350° C. until that portion of the unwanted residues of polyethylene terephthalate which will melt and flow into a removable location has been melted and removed from said apparatus, and then (B) internally contacting said apparatus with a gas heated at from about 325° to about 525° C. until the remaining unwanted residues of polyethylene terephthalate have been vaporized.

When the apparatus itself is also heated according to the preferred embodiments of this invention, it is essential that the apparatus temperature at all points above 300° C. be increased gradually at a rate not to exceed 50° C. per hour so as to avoid carbonaceous degradation.

The simplicity of this invention and its ease of accomplishment might appear to detract from the unobvious quality arising out of the expectation that unwanted residue of polyester would char or otherwise form carbonaceous decomposition products when the unwanted polyester residues were subjected to the conditions described in the above process covered by this invention. However, it is well known that polyester film, scrap, and other residues turn yellow and begin to take on a rather dark color during prolonged heating, even in the absence of air. The pressure of air appears to hasten this process. It was therefore to be expected that a process such as that covered by this invention would result in the formation of a carbonaceous decomposition product which could not be removed except by very severe methods such as by burning or some other procedure which would damage the apparatus and would not be practical. That the process of this invention was effective and advantageous was the result of an accidental discovery by the inventor and the source of considerable surprise to those to whom he communicated knowledge of the invention and who were skilled in the art to which this invention pertains.

The invention can be practiced according to a preferred embodiment by placing the apparatus to be cleaned in a suitable position in a muffle furnace at a temperature above the melting point of the resin. The muffle furnace used in practicing this invention was electrically heated and the heated chamber was well insulated. The door to the furnace was also insulated and when closed provided a fit which allowed air from outside the furnace to enter and leave through the space between the door and the opening in the furnace. Some air circulation is essential since an explosion may occur if the hot vapors are allowed to build up to a critical concentration in the oven. In heating a piece of apparatus in the furnace, the temperature selector for the furnace was set at the desired maximum temperature and the air temperature within the furnace was allowed to rise to the maximum temperature during which time the portion of the unwanted residue of polyester which would melt was allowed to flow into a receptacle beneath the heated apparatus. By removing the unwanted residues which would melt from the apparatus in this manner, the remaining residues are not subjected to air temperatures from about 325° to about 525° C. for more than a few hours before they are completely vaporized. Thus, the vaporization takes place before degradation with consequent formation of carbonaceous decomposition products. In using a muffle furnace for accomplishing the thermolytic cleaning of this invention, it is necessary that the furnace be of adequate size to contain the piece of apparatus being cleaned. Moreover, it is advantageous not to allow the temperature within the furnace to exceed about 325° C. to about 350° C. until that portion of the unwanted residues which will melt has been allowed to flow to a location such as a pan or other receptacle under the piece or pipe, the filter or other piece of apparatus. By heating the apparatus in a furnace, external radiant heating takes place so that the apparatus is heated more quickly than by using hot gas as the sole heating means. The use of such external heating is quite advantageous since it allows more rapid performance of the cleaning process and helps to obviate any carbonaceous degradation.

When using a muffle furnace, the temperature setting can be put at about 325°–350° C. and the piece of apparatus visually observed so as to determine when substantially all of the polyester which will melt has been removed. It is not necessary to determine the exact temperature when this has been accomplished and it is not essential that the temperature be raised any higher than about 325° C. in order to accomplish the second step of the process. However, temperatures approaching 400° C. are more effective for the second step (vaporization) since the time required is reduced in accordance with the height of the temperatures used. Thus, in order to secure the most advantageous results, the temperature setting of the muffle furnace should be raised to about 400°–525° C. and the apparatus observed until there is no more evidence of any vaporization of polyester. This vaporization step can generally be accomplished in from an hour up to about 24 hours depending upon the size of the piece of apparatus and the temperature employed.

The invention is most advantageously applied in the cleaning of sintered powdered stainless steel filters as well as filters made of sintered or welded stainless steel wire mesh (Rigi-mesh filters are an example) and other similar filters made from stainless steel or other chemically inert metals, such filters being used to remove unwanted contaminating materials from molten polyester while processing a highly polymeric polyester such as polyethylene terephthalate. These filters contain small pores having a size on the order of from 1 to 25 microns and gradually accumulate unwanted residues of polyethylene terephthalate during use. For example, a sintered (sometimes called fritted) stainless steel filter encrusted with solidified polyethylene terephthalate was removed from the completely assembled polyester processing apparatus and was placed in a muffle furnace at room temperature. The controls were adjusted to allow a maximum temperature of 360° C. and the muffle furnace was turned on. As the temperature slowly rose over a period of several hours, the polymer melted and drained from the filter into an aluminum dish which was placed beneath the filter with the filter being suspended above the dish. Care was exercised to be sure that the door on the furnace had enough clearance to allow some air to circulate into and out of the furnace. The temperature within the filter (apparatus temperature) did not pass the 325° mark during the course of this melting operation although the maximum temperature which could have been reached at the setting was 360° C. However, after all of the material had been melted from the filter which would flow away, the temperature continued to rise because of the setting of the furnace and the remaining residues of the unwanted polyester began to vaporize. The molten polyester which collected in the dish was removed from the furnace and was found to be a tan to a dark brown material showing evidence of a carbonaceous decomposition. Twenty to 24 hours after starting the heat treatment the filter was removed from the muffle furnace and allowed to cool. The filter has a clean appearance and allowed water and acetone to pour through it freely.

In some instances the filter cleaned as described above can be further treated by immersion for about 20–30 minutes in a bath composed of 40 parts of potassium hydroxide, 300 parts of ethylene glycol and 60 parts of water heated at about 120° C. However, actual practice has not shown that any significant advantage is achieved by following the thermolytic cleaning method with the immersion process. In lieu of the immersion process, the thermolytically cleaned filter can be back washed with steam or air under pressure so as to remove anything which might conceivably remain within the filter. Although this type of treatment is of some value, the thermolytically cleaned filters have been put back into the apparatus and found to serve quite satisfactorily without having been subjected to any other treatment. It appears that the thermolytic treatment does leave a very faint trace of a hazy coating and perhaps a minute trace of gray-tan fluffy ash on the surfaces of cleaned filters as shown by microscopic inspection. However, the residual materials do not appear to have any effect upon the use of the apparatus and do not appear to build up from one cleaning operation to the next cleaning operation as a result of repeated contact with polyester in between the cleaning operations.

Although the washing or steam treatment of the filter after its thermolytic cleaning generally is not essential, little additional effort is involved in the washing of the filter with water, acetone, aqueous alkaline solution, ethylene glycol, or some other fluid as a final precautionary measure since it is well recognized during plant operations that even a few stray particles left in the filter might result in the spoiling of a considerable amount of polyester film or might result in the malfunctioning of the completely assembled apparatus used in processing the polyester. It is for this reason that the use of back washing or rinsing with various fluids has been discussed above.

Although a muffle furnace is the most convenient way of cleaning small pieces of apparatus which can be disassembled from the completely assembled apparatus, it is apparent that the cleaning operation can be performed using a great variety of techniques so long as the process is fundamentally the same as that broadly described above.

One way for accomplishing the thermolytic process of this invention is to use the external heating means normally present on the apparatus during its use in the completely assembled apparatus. Such means include electrically heated wrappings around the apparatus or include integral hollow spaces in the apparatus through which heated liquids can be passed. Thus, a jacket surrounding the apparatus containing a high boiling organic liquid is often used for externally heating pipes and other types of apparatus used in processing polyethylene terephthalate and the like. When such an external heat source is relied upon for practicing this invention, it is advantageous to pass air into the apparatus which either becomes heated by the heated apparatus or which can be initially heated before being introduced. During the earlier stages of such heating the unwanted residues of polyethylene terephthalate which can melt and flow away are allowed to do so such as by allowing them to flow out of one end of a pipe containing a fritted stainless steel filter being treated by the thermolytic process. When this pipe includes a filter element, a longer period of time for the melting operation may be required and it may be advantageous to change the position of the apparatus more than once in order to remove as much as possible of that part of the unwanted residues which can be removed by melting. The remainder of the unwanted residues can then be removed by raising the temperature to substantially above 325° C. If desired, gas under pressure can be passed into such apparatus although the introduction of such a gas when there is a filter in the line may not initially flow through the filter. However, when the filter has become partially freed from unwanted residue, the gas will pass through the filter and will increase the rapidity of the cleaning operation. Such a gas can include ordinary air, air containing a high amount of moisture including air mixed with steam, steam, carbon dioxide, various industrial gases, etc. The main purpose in having contact with the gas is to dilute and in some cases carry away the vapors of polyesters. By causing the gas to flow, this purpose can be better achieved.

The use of moist air or steam as the gas also serves an additional advantage in that the presence of water appears to hasten the vaporization of polyester.

As has been mentioned, the use of a subsequent cleaning operation following the thermolytic process of this invention has its greatest value in the case of the use of steam or moist air. After steam or moist air is used, the apparatus should be thoroughly dried before using it again in processing polyester.

The thermolytic process of this invention can be used most advantageously in cleaning apparatus which is subject to thermal damage at temperatures above 1000° F. (538° C.), such as fritted or sintered stainless steel filters, since such apparatus cannot be subjected to high enough temperatures to merely burn out the unwanted polyester residues without destroying the future usefulness of the apparatus.

Although the invention has been described in considerable detail with reference to certain preferred embodiments thereof, it will be understood that variations and modifications can be effected without departing from the spirit and scope of the invention as described hereinabove and as defined in the appended claims.

I claim:
1. A thermolytic method for removing unwanted residues of polyethylene terephthalate from apparatus which has been used in processing polyethylene terephthalate which comprises (A) internally contacting said apparatus with a gas heated at from about 275° C. to about 350° C. until that portion of the unwanted residues of polyethylene terephthalate which will melt and flow into a removable location has been melted and removed from said apparatus, and then (B) internally contacting said apparatus with a gas heated at from about 325° to about 525° C. until the remaining unwanted residues of polyethylene terephthalate have been vaporized, wherein during said internal contact with the heated gas said apparatus is also externally heated at an apparatus temperature not substantially greater than 325° C. during step (A) and not substantially greater than 525° C. during step (B), said apparatus temperatures being achieved at all points above 300° C. at a gradual rate not to exceed 50° C. per hour.

2. A process as defined by claim 1 wherein said external heating is accomplished using external heating means normally employed during the manufacture of polyethylene terephthalate in said apparatus.

3. A process as defined by claim 2 wherein said gas is air.

4. A process as defined by claim 3 wherein said heated air contains water vapor and after step (B) said apparatus is flushed with steam and then dried prior to its next contact with polyethylene terephthalate.

5. A process as defined by claim 1 wherein said external and internal heating is accomplished by placing said apparatus in a heated oven.

6. A process as defined by claim 5 wherein said gas is air.

7. A process as defined by claim 6 wherein said apparatus is a fritted microporous stainless steel filter impregnated with residues of polyethylene terephthalate accumulating in said filter during the processing of molten polyethylene terephthalate.

8. A process as defined by claim 7 wherein said filter is subjected to a superatmospheric pressure of said gas against said filter until said gas can pass therethrough and a flow of said gas through said filter is then maintained until step (B) is complete.

9. A process as defined by claim 8 wherein after step (B) is complete, steam is passed through said filter and it is then dried.

10. A process as defined by claim 8 wherein after said step (B) is complete, said filter is washed with a dilute aqueous alkaline solution, then with water and then dried.

References Cited in the file of this patent
UNITED STATES PATENTS
2,563,085   Utsinger _____ Aug. 7, 1951